United States Patent
Gavin et al.

(10) Patent No.: US 10,083,000 B2
(45) Date of Patent: Sep. 25, 2018

(54) MITIGATING AN INDUCED ELECTRICAL SIGNAL FROM AN APPLIANCE IN A POWERED-OFF STATE

(71) Applicant: CIS Secure Computing, Inc., Dulles, VA (US)

(72) Inventors: Daniel Gavin, Charles Town, WV (US); Frederick E. Koenig, Nokesville, VA (US)

(73) Assignee: CIS SECURE COMPUTING, INC., Dulles, VA (US)

( * ) Notice: Subject to any disclaimer, the term of this patent is extended or adjusted under 35 U.S.C. 154(b) by 0 days.

(21) Appl. No.: 15/482,143

(22) Filed: Apr. 7, 2017

(65) Prior Publication Data
US 2017/0322765 A1 Nov. 9, 2017

Related U.S. Application Data

(60) Provisional application No. 62/333,081, filed on May 6, 2016.

(51) Int. Cl.
*G06F 21/60* (2013.01)
*H04M 3/20* (2006.01)
*G06F 3/16* (2006.01)

(52) U.S. Cl.
CPC ............ *G06F 3/165* (2013.01); *G06F 21/602* (2013.01); *H04M 3/205* (2013.01)

(58) Field of Classification Search
CPC .................................................... H04M 3/205
USPC .................................................... 307/89–91
See application file for complete search history.

(56) References Cited

U.S. PATENT DOCUMENTS 6,492,880 B1 * 12/2002 Chiappe .............. H04L 25/0266
                                                            333/22 R
8,199,922 B2   6/2012  Render et al.
8,325,759 B2  12/2012  Hazani et al.
8,363,797 B2   1/2013  Binder
(Continued)

FOREIGN PATENT DOCUMENTS

CN    201004672 Y    1/2008
EP    1764780 A1    3/2007

OTHER PUBLICATIONS

International Search Report and the Written Opinion of the International Searching Authority in International Application No. PCT/US2017/031082 dated Jul. 24, 2017.

*Primary Examiner* — Fritz M Fleming
(74) *Attorney, Agent, or Firm* — The Marbury Law Group, PLLC

(57) ABSTRACT

An isolation unit may include input pins to receive an electrical signal induced by ambient sound waves incident on an appliance in a powered-off state, one or more first transformers, connected to the input pins, to electrically isolate the induced electrical, one or more second transformers, connected to the first transformers, to provide a common mode choke function on the induced electrical signal, one or more inductors, connected to the one or more second transformers, one or more resistors, connected to the one or more inductors, wherein the one or more inductors and the one or more resistors are configured to limit an amplitude of a current of the induced electrical signal, and output pins, connected to the one or more inductors, to receive a modified electrical signal from the one or more inductors to propagate the modified electrical signal to a downstream cable.

22 Claims, 12 Drawing Sheets

(56) References Cited

U.S. PATENT DOCUMENTS

| | | |
|---|---|---|
| 8,699,235 B2 | 4/2014 | Soufan |
| 9,158,496 B2 | 10/2015 | Soffer |
| 9,285,854 B2 | 3/2016 | Peto |
| 2009/0067614 A1 | 3/2009 | Washburn et al. |
| 2009/0108964 A1 | 4/2009 | Nguyen et al. |
| 2009/0161884 A1* | 6/2009 | Render ........... H04M 3/205 381/66 |
| 2009/0195303 A1 | 8/2009 | Bowhers |
| 2015/0003620 A1 | 1/2015 | Wu et al. |

* cited by examiner

MITIGATING AN INDUCED ELECTRICAL SIGNAL FROM AN APPLIANCE IN A POWERED-OFF STATE

RELATED APPLICATIONS

This application claims the benefit of priority to U.S. Provisional Application No. 62/333,091 entitled "Mitigating An Induced Electrical Signal From An Appliance In A Powered-Off State" filed May 6, 2016, the entire contents of which is hereby incorporated by reference.

BACKGROUND

Communication security is a vital part of many aspects of government and business. While encryption and other means of signal obfuscation may provide a layer of security for communication devices when such devices are in operation, consideration must also be given to signal security even when such devices are not in operation, such as in a powered down or inoperative state.

SUMMARY

The various embodiments include systems and methods of mitigating an induced electrical signal from an appliance. In some embodiments, the induced electrical signal may be induced by ambient sound waves incident on an appliance. In some embodiments, the induced electrical signal may be induced by ambient sound waves incident on the appliance when the appliance is in a powered-off state. In various embodiments, the induced electrical signal may be a triboelectrically or piezoelectrically induced electrical signal from the appliance when the appliance is in a powered-off state.

In various embodiments, the isolation unit may operate on the induced electrical signal to produce a modified signal, such that the modified signal output by the isolation unit, e.g., when propagated from the isolation unit through a downstream cable, cannot be transformed to extract an intelligible audio signal. Thus, the modified signal, when transformed to extract an audio signal, may only provide an unintelligible audio signal. In some embodiments, the unintelligible audio signal may be an unintelligible speech signal.

Various embodiments may include an isolation unit, which may include input pins, configured to receive an induced electrical signal that is induced by ambient sound waves incident on an appliance when the appliance is in a powered-off state, one or more first transformers, connected to the input pins, configured to electrically isolate the induced electrical signal, one or more second transformers, connected to the one or more first transformers, configured to receive the induced electrical signal from the one or more first transformers, and further configured to provide a common mode choke function on the induced electrical signal, one or more inductors, connected to the one or more second transformers, and one or more resistors, connected to the one or more inductors, wherein the one or more inductors and the one or more resistors are configured to limit an amplitude of a current of the induced electrical signal, and output pins, connected to the one or more inductors, configured to receive a modified electrical signal from the one or more inductors, and configured to propagate the modified electrical signal to a downstream cable.

In some embodiments, the one or more first transformers may be further configured to provide a frequency filtration function on one or more frequencies of the induced electrical signal. In some embodiments, the one or more second transformers may be further configured to cancel one or more aspects of an amplitude of the induced electrical signal. In some embodiments, the modified electrical signal may not be transformed into an intelligible audio signal In various embodiments, the isolation unit may include a signal modifier. In some embodiments, the signal modifier may be configured to receive an induced electrical signal from an appliance, wherein the induced electrical signal is induced by ambient sound waves incident on the appliance, modify the induced electrical signal to produce a modified electrical signal that may not be transformed into an intelligible audio signal, and output the modified electrical signal. In some embodiments, the induced electrical signal may be one of triboelectrically induced by ambient sound waves incident on the appliance and piezoelectrically induced by ambient sound waves incident on the appliance. In some embodiments, the induced electrical signal may be induced by the ambient sound waves incident on the appliance when the appliance is in a powered-off state.

In some embodiments, the signal modifier may further include one or more first transformers, configured to electrically isolate the induced electrical signal. In such embodiments, the one or more first transformers may be configured to provide a frequency filtration function on one or more frequencies of the induced electrical signal. In some embodiments, the one or more first transformers may be configured to attenuate the one or more frequencies of the induced electrical signal in range of from approximately 200 Hz to approximately 10,000 Hz. In some embodiments, the one or more first transformers may be configured to attenuate the one or more frequencies of the induced electrical signal in a range of from approximately 300 Hz to approximately 5,000 Hz. In some embodiments, the signal modifier may be further configured such that an amplitude of the modified electrical signal is substantially below −120 dB.

In some embodiments, the signal modifier may further include one or more second transformers, configured to receive the induced electrical signal from the one or more first transformers, and further configured to provide a common mode choke function on the induced electrical signal. In some embodiments, the one or more second transformers may be configured to cancel one or more aspects of an amplitude of the induced electrical signal.

In some embodiments, the signal modifier may further include one or more inductors, configured to limit an amplitude of a current of the induced electrical signal. In some embodiments, the signal modifier may further include one or more resistors, in communication with the one or more inductors, wherein the one or more inductors and the one or more resistors are configured to limit the amplitude of the current of the induced electrical signal.

Further embodiments may include a method of modifying an induced electrical signal is induced by ambient sound waves incident on an appliance. Further embodiments may include an isolation unit including means for performing functions of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
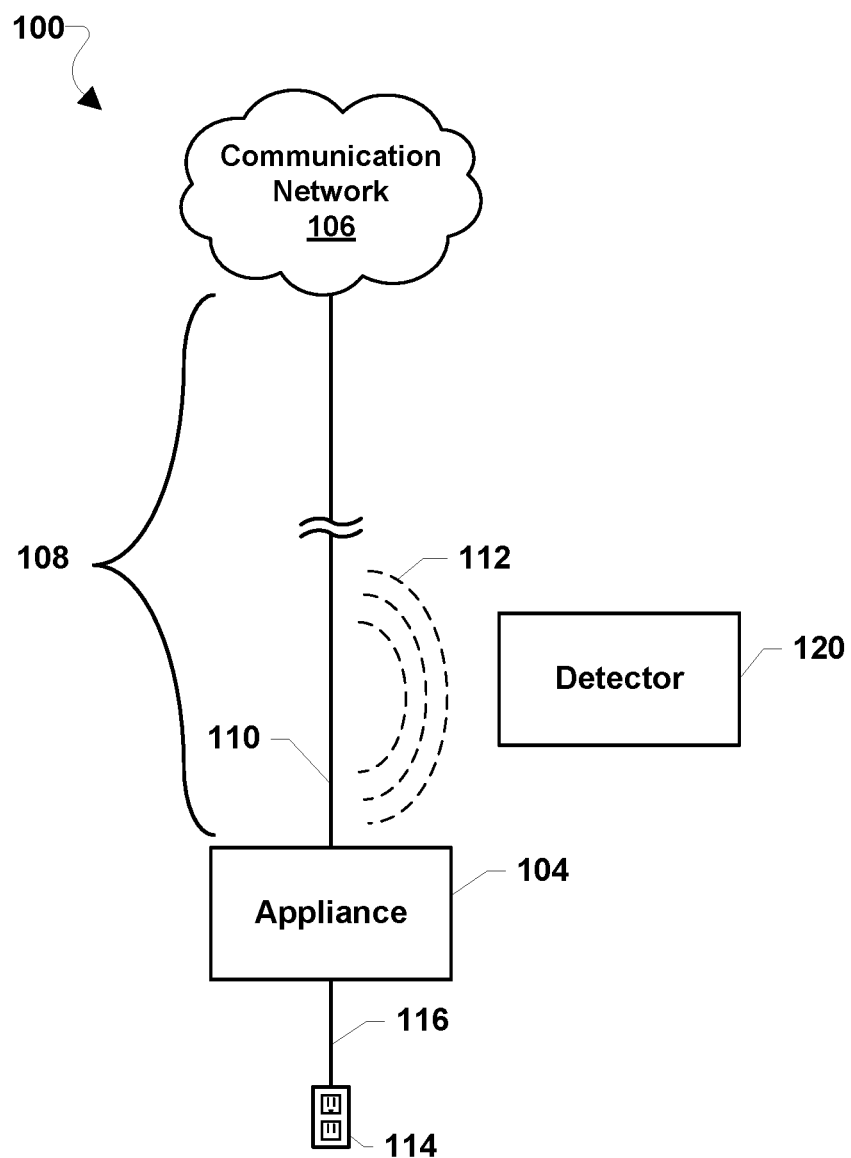
FIG. 1 is a block diagram of a conventional communication system.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

Communication security is a vital part of many aspects of government and business. While encryption and other means of signal obfuscation may provide a layer of communication security for communication devices when such devices are in operation, consideration must also be given to the security of signals that may be generated even when such devices are not in operation, such as in a powered down or inoperative state (e.g., when a telephone is in an on-hook state, or when a printer is idle and not operating to form images).

The various embodiments include systems and methods of mitigating an induced electrical signal from an appliance in a powered-off or powered-down state. In various embodiments, an isolation unit may be coupled to an appliance to mitigate a triboelectrically- or a piezoelectrically-induced signal emanating from the appliance. In some embodiments, the electrical appliance may be in a powered-off state, and the electrical signal emanating from the appliance may be induced by ambient sound encountering a surface of the appliance that may vibrate. The vibrating surface may include one or more portions of a body of the appliance (such as an exterior surface, a shell, a casing, or a housing) or another component of the appliance, for example, a window, a panel, a button, a switch, a cover, or another element of the appliance that may encounter incident sound waves. In some embodiments, the electrical signal emanating from the appliance may be induced by sound waves of ambient speech that encounter a surface of the appliance. The induced electrical signal may propagate along a propagation path coupled to the appliance, such as a cable coupled to the appliance. Further, the induced electrical signal may be detected along a path of propagation (e.g., the cable) and the detected electrical signal may be transformed to extract intelligible audio, including intelligible speech. Thus, the induced triboelectrical signal or a piezoelectrical signal emanating from the appliance may represent a security vulnerability for such locations where such appliances are used.

In various embodiments, the isolation unit may receive the electrical signal from the appliance (e.g., the triboelectrically- or a piezoelectrically-induced signal emanating from the appliance in a powered-off state) and may operate on the electrical signal to produce a modified signal, such that the modified signal, when propagated through a propagation path, cannot be transformed to extract an intelligible audio signal. In some embodiments, the modified signal, when propagated through a propagation path, cannot be transformed to extract an intelligible speech signal.

In various embodiments, the isolation unit may receive an electrical signal from the appliance (e.g., the triboelectrically- or a piezoelectrically-induced signal emanating from the appliance in a powered-off state) and may operate on the electrical signal to produce a modified signal having a signal level that is below a threshold signal level. In some embodiments, the threshold signal level may be determined such that the modified signal cannot be transformed to extract an intelligible audio signal. In various embodiments, the modified signal may be below the threshold signal level such that the isolation unit satisfies one or more security requirements and/or regulations. For example, the isolation unit may operate on the electrical signal to produce a modified signal such that the isolation unit may satisfy the Committee on National Security Systems (CNSS) Instruction No. 5001. In some embodiments, the isolation unit may enable an appliance coupled to the isolation unit to satisfy the one or more security requirements and/or regulations (e.g., CNSS Instruction No. 5001).

FIG. 1 illustrates a conventional communication system 100. An appliance 104 may communicate with a communications network 106 via a communication link 108. A portion of communication link may include a physical connector 110 to couple the appliance 104 to, for example, a communications jack, a modem, router, or another network communication device or connection outlet. The appliance 104 may also be coupled to a power supply, such as electrical outlet 114, via electrical cable 116. The appliance 104 may include any device that may communicate with the communications network 106 over the communication link 108, such as a voice over Internet protocol (VoIP) telephone, a computer, a printer, a network connected storage device, a router, a modem, or another similar device.

When the appliance 104 in a powered-off state (e.g., is not in operation), the appliance 104 may yet emanate small electrical signals. For example, ambient sound waves in the location of the appliance 104 may encounter a surface of the appliance 104. The appliance 104 may emanate an electrical signal that is triboelectrically or piezoelectrically induced based on the ambient sound waves. The induced electrical signal may propagate along the physical connector 110. Further, the induced electrical signal 112 may be detected by a detector 120, such as a signal detector directly or indirectly coupled to the physical connector 110 (e.g., by a wired or wireless connection).

The electrical signal that is detected by the detector 120 may be transformed into an audio signal. In some cases, the detected electrical signal may be transformed into an intelligible audio signal such that the induced electrical signal may be used to eavesdrop on audio (e.g., conversations) in proximity to the appliance 104.

Figure 2:
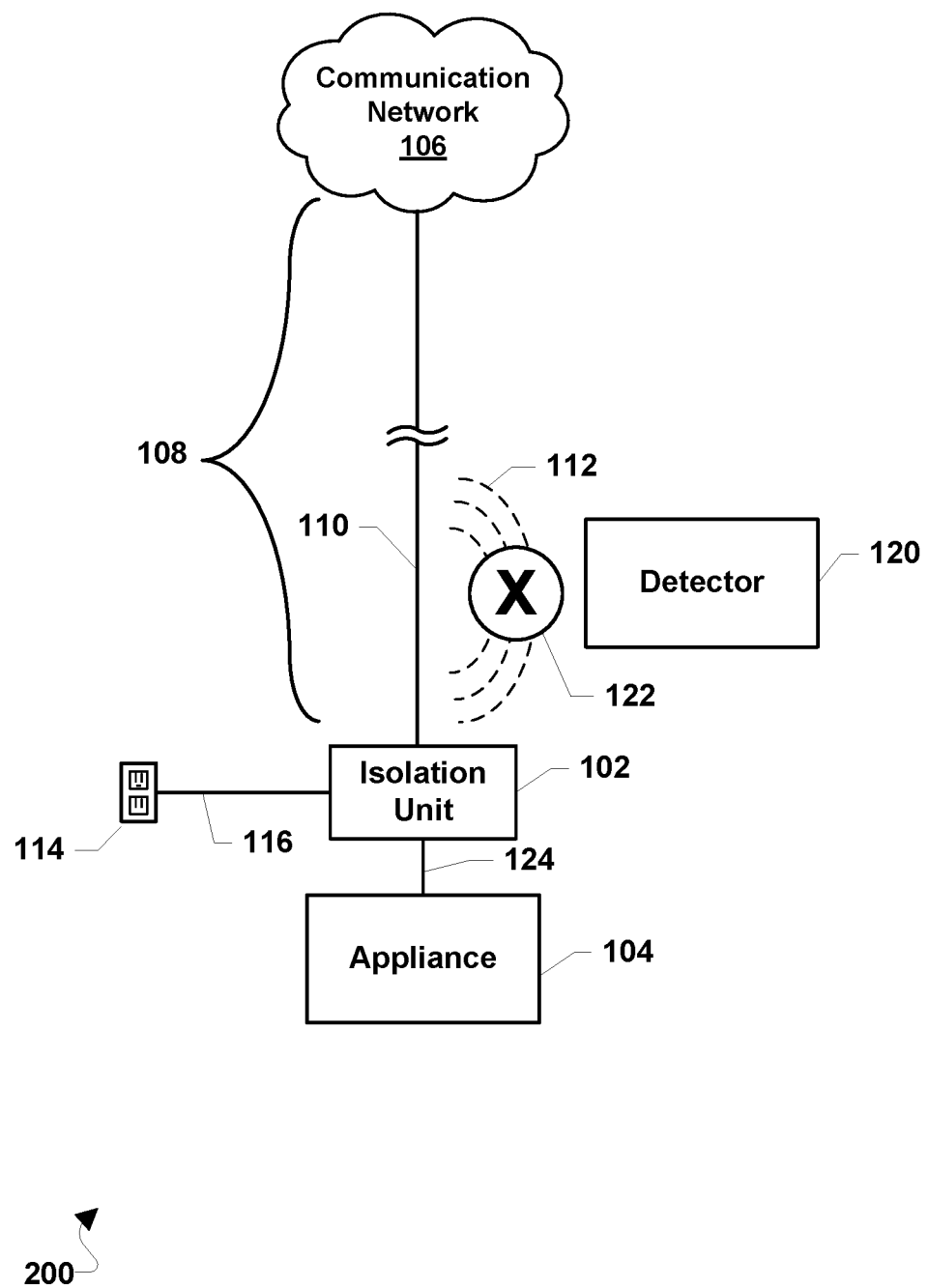
FIG. 2 is a block diagram of a communication system according to various embodiments.

FIG. 2 illustrates a communication system 100 suitable for use with the various embodiments. With reference to FIGS. 1 and 2, the appliance 104 may be coupled to an isolation unit 102 by a connector 124. The isolation unit may be coupled to the physical connector 110 of the communication link 108 such that communications from the appliance 104 to the communication network 106 pass through the isolation unit 102. The isolation unit 102 may also be coupled to a power supply, such as the electrical outlet, via the electrical cable 116. In various embodiments, the isolation unit 102 may modify 122 triboelectrically or piezoelectrically induced electrical signals emanated by the appliance 104, such as triboelectrically or piezoelectrically induced electrical signals emanated by the appliance 104 in a powered-off state. In some embodiments, the isolation unit 102 may operate on the electrical signal to generate a modified electrical signal. The modified electrical signal may then propagate from the isolation unit 102 via the physical connector 110. In various embodiments, the isolation unit 102 may modify the electrical signal such that even if the modified electrical signal is detected by the detector 120, the modified electrical signal is mitigated such that the modified electrical signal may not be transformed into an intelligible audio signal. In some embodiments, the isolation unit 102 may operate on the emanated electrical signal such that the mitigated electrical signal is below a threshold amplitude.

Figure 3:
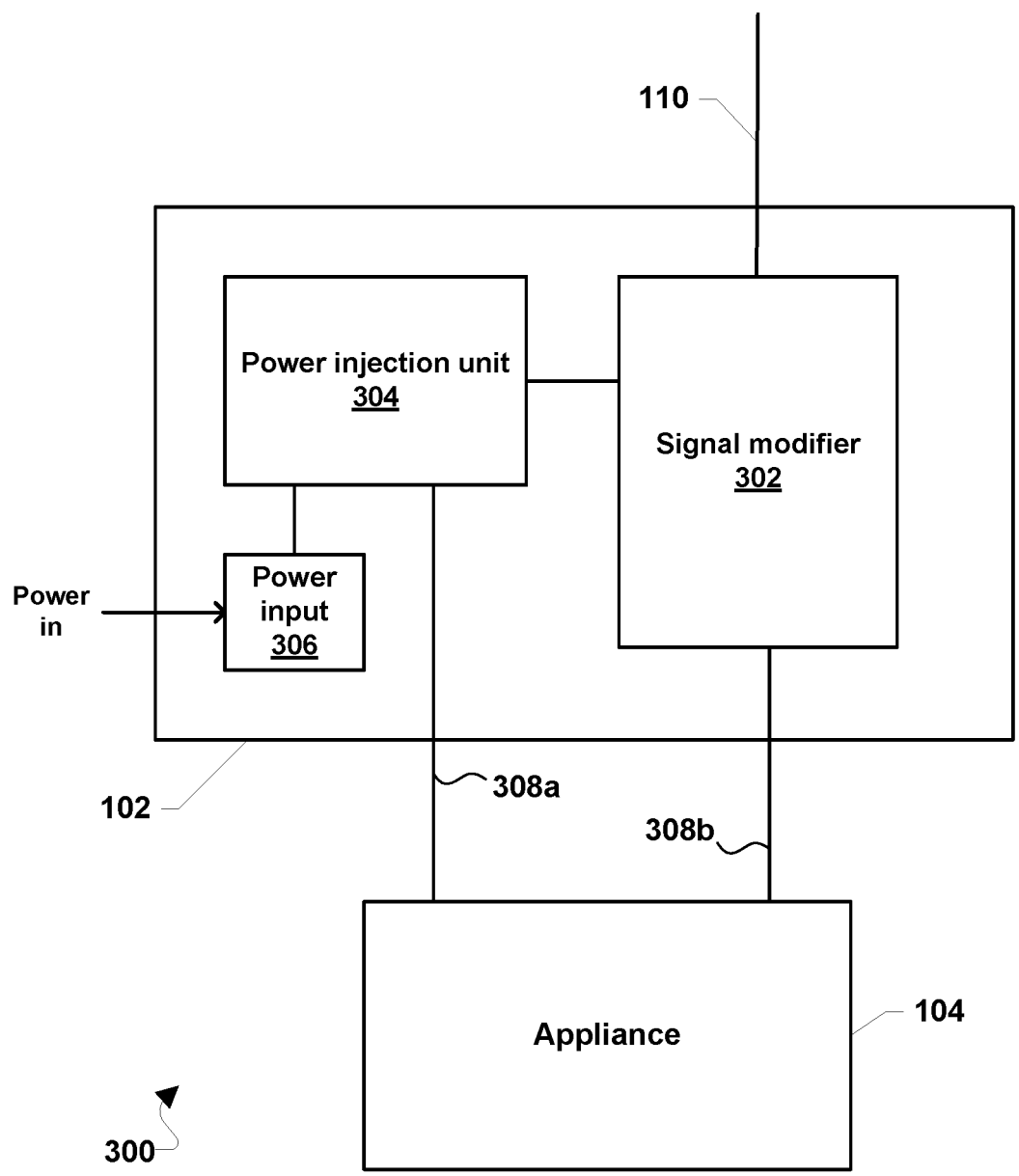
FIG. 3 is a block diagram of a communication system according to various embodiments.

FIG. 3 illustrates a communication system 300 suitable for use with the various embodiments. With reference to FIGS. 1-3, the isolation unit 102 may include a signal modifier 302, a power injection unit 304, and a power input 306. The power input 306 may receive power, for example, from an electrical source such as a direct current (DC) source or an alternating current (AC) source, such as an electrical outlet. The power input 306 may provide the received power to the power injection unit 304. The power injection unit 304 may provide power to the appliance 104, e.g., via a connection 308a. The power injection unit 304 may also be coupled to the signal modifier 302. In some embodiments, the power injection unit may provide the power to the appliance 104 via a connection 308b between the signal modifier 302 and the appliance 104. In some embodiments, the connections 308a and 308b may be a single connector (e.g., a single physical cable) between the isolation unit 102 and the appliance 104.

The signal modifier 302 may be coupled to the appliance 104 such that the signal modifier 302 may receive a triboelectrically or piezoelectrically induced electrical signal from the appliance 104, such as triboelectrically or piezoelectrically induced electrical signals emanated by the appliance 104 in a powered-off state. The signal modifier 302 may operate on the induced electrical signal to produce a modified signal. The signal modifier 302 may pass the modified signal to the physical connector 110.

Figure 4:
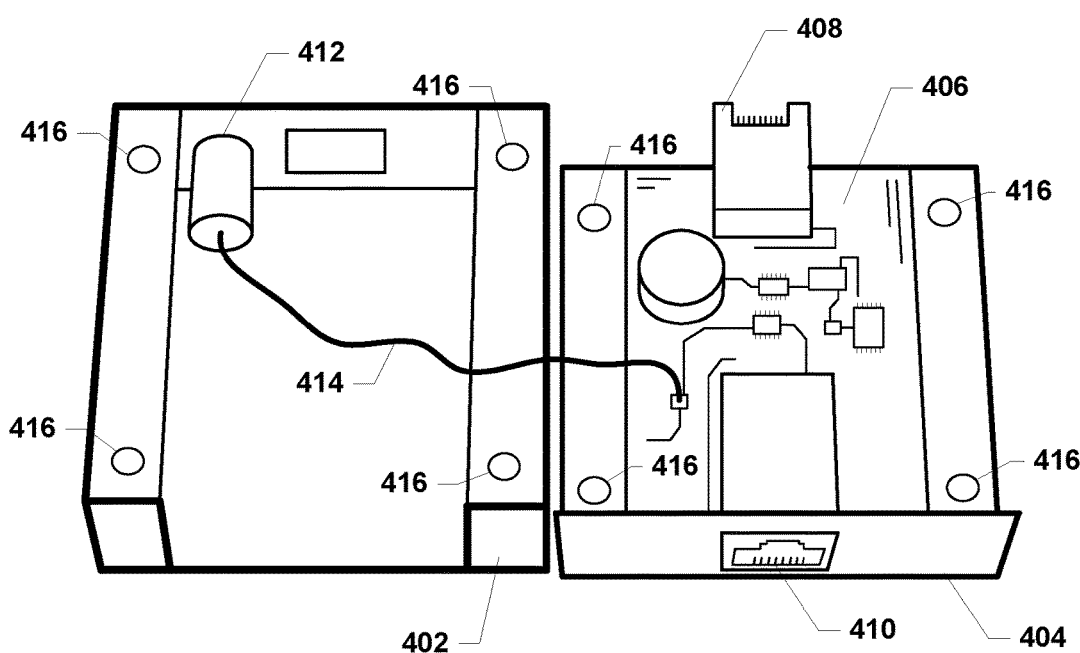
FIG. 4 is a component diagram illustrating an embodiment isolation unit.

FIG. 4 is a component diagram illustrating an embodiment isolation unit 400. With reference to FIGS. 1-4, the isolation unit 400 may be similar to the isolation unit 102. The isolation unit 400 may include a housing comprising a first housing component 402 and a second housing component 404, which may be coupled to enclose other components of the isolation unit 400, for example, via screws inserted through screw holes 416.

The isolation unit 400 may also include a circuit board 406. The circuit board 406 may include an appliance connector 408 and a network communications connector 410. The appliance connector 408 may enable the isolation unit 400 to be coupled to an appliance (e.g., the appliance 104). The network communications connector 410 may enable the isolation unit 400 to be coupled to a physical connector (e.g., the physical connector 110) to enable network communications.

The isolation unit 400 may also include a power connector 412, which may enable the isolation unit 400 to be coupled to a power supply. Supplied power may be provided to the circuit board 406 from the power connector 412 via a power cable 414. In some embodiments the power connector 412 may include an AC/DC converter.

Figure 5:
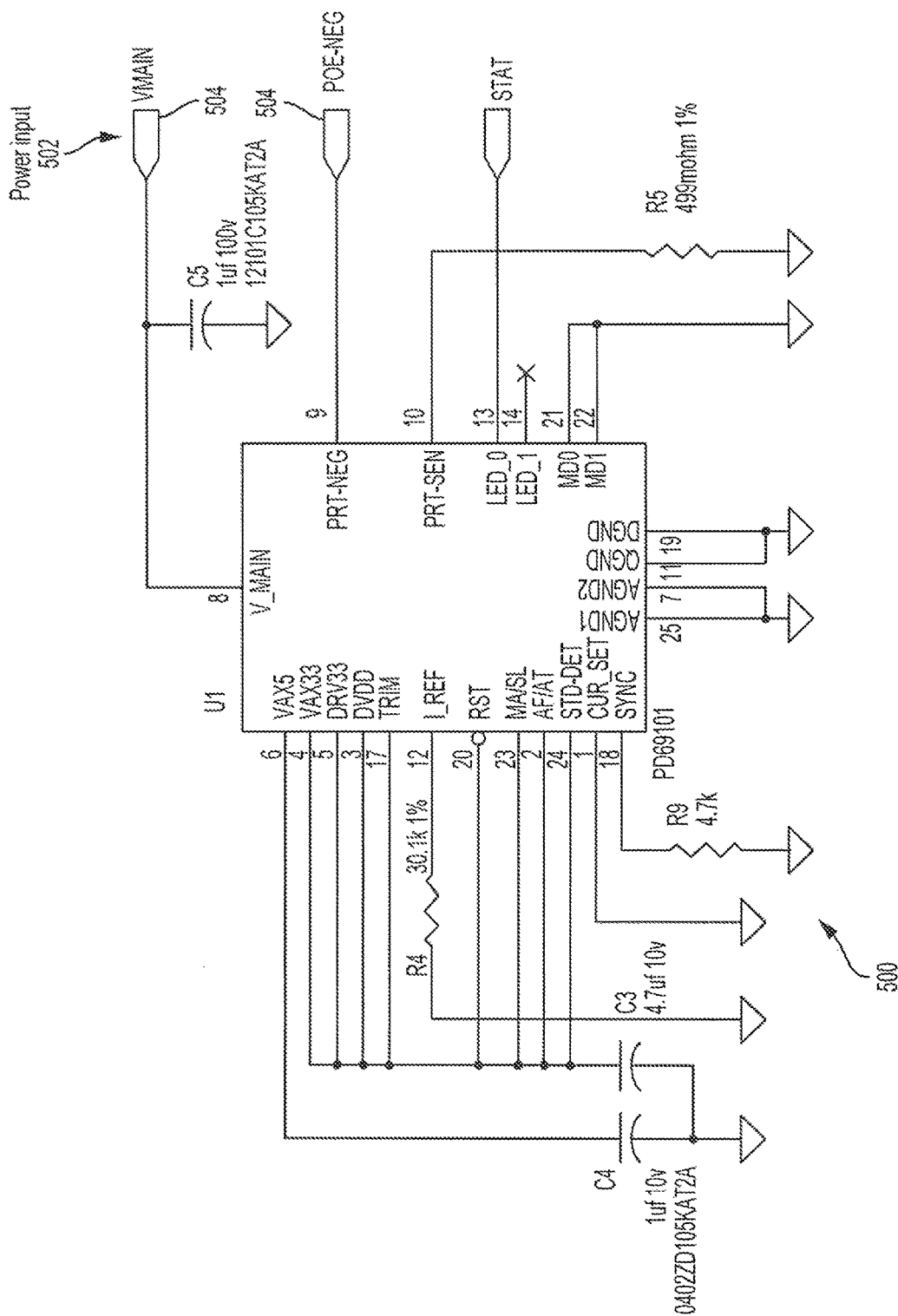
FIG. 5 is a circuit diagram illustrating a power injection unit of an embodiment isolation unit.

FIG. 5 is a circuit diagram illustrating a power injection unit 500 of an embodiment isolation unit. With reference to FIGS. 1-5, the power injection unit 500 may be similar to the power injection unit 304 of the isolation unit 102. The power injection unit 500 may include a power input 502 (which may be similar to the power connector 412 and the power input 306) which may enable the power injection unit 500 to receive electrical power (e.g., from a DC power source). The power injection unit 500 may also include a power coupling 504, which may be configured to provide electrical power to the isolation unit 102. In some embodiments, the power injection unit 500 may be configured to provide electrical power to an appliance (e.g., the appliance 104) together with a communications connection, such as by Power Over Ethernet (POE). The power injection unit 500 may also include various other electronic components, including resistors, capacitors, ground connections, description of which is omitted for brevity.

Figure 6:
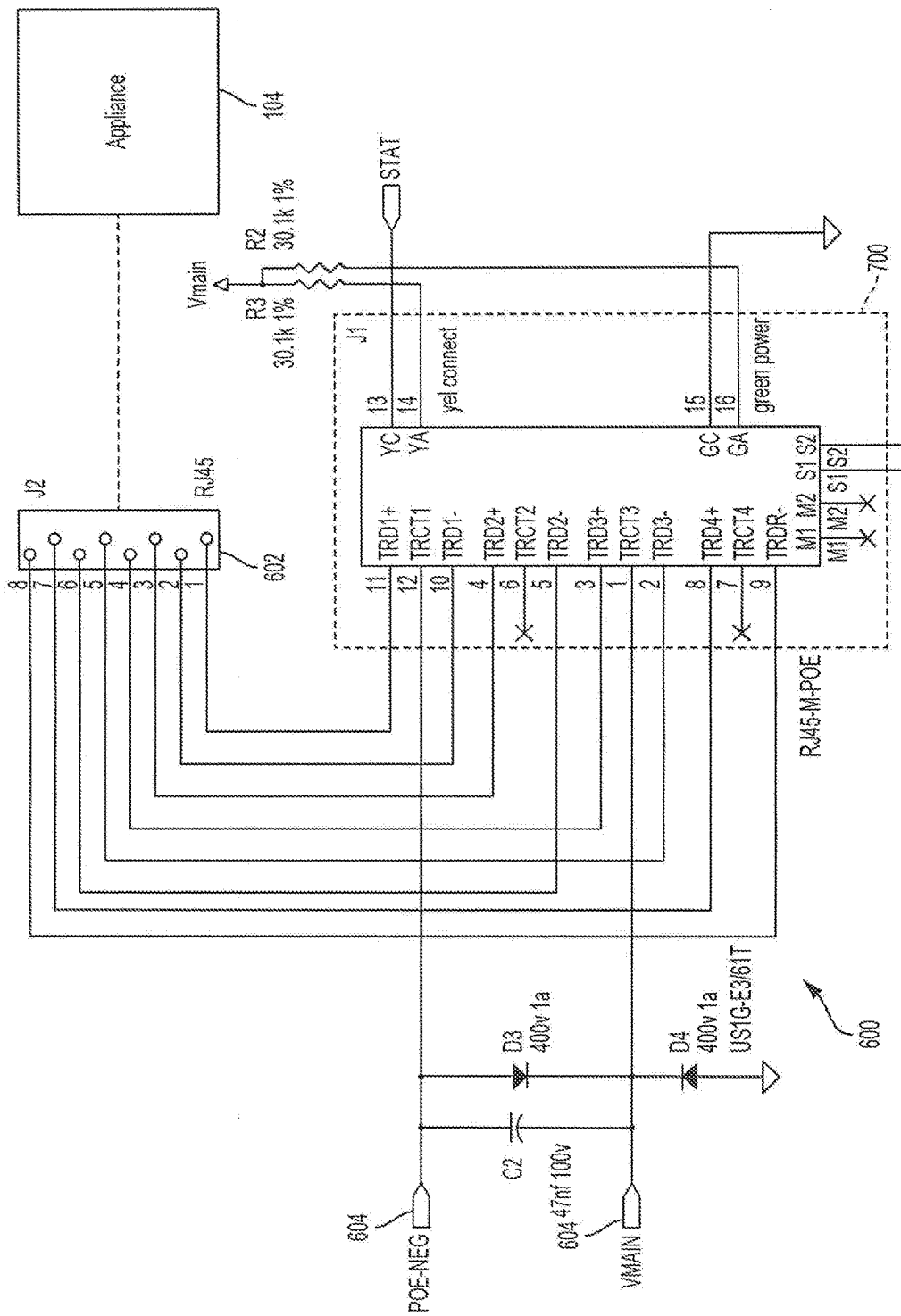
FIG. 6 is a circuit diagram illustrating a signal modifier of an embodiment isolation unit.

FIG. 6 is a circuit diagram illustrating a signal modifier 600 of an embodiment isolation unit. With reference to FIGS. 1-6, the signal modifier 600 may be similar to the signal modifier 302. The signal modifier 600 may include an appliance connector 602 (which may be similar to the appliance connector 408) to that may enable the signal modifier 600 to be coupled to an appliance (e.g., the appliance 104). In some embodiments, the appliance connector 602 may receive a triboelectrically or piezoelectrically induced electrical signal from the appliance 104.

The signal modifier 600 may also include a power coupling 604, which may be coupled to the power coupling 504 of the power injection unit 304. The power coupling 604 may be configured to receive power from the power coupling 504 such as that power may be provided to an appliance that is coupled to the isolation unit.

The appliance connector 602 and the power coupling 604 may each be coupled to a signal modifier subunit 700. The signal modifier subunit 700 may be configured to receive the induced electrical signal from the appliance connector 602, modify the induced electrical signal, and to pass the modified electrical signal to one or more output pins 712 (FIG. 7).

Figure 7:
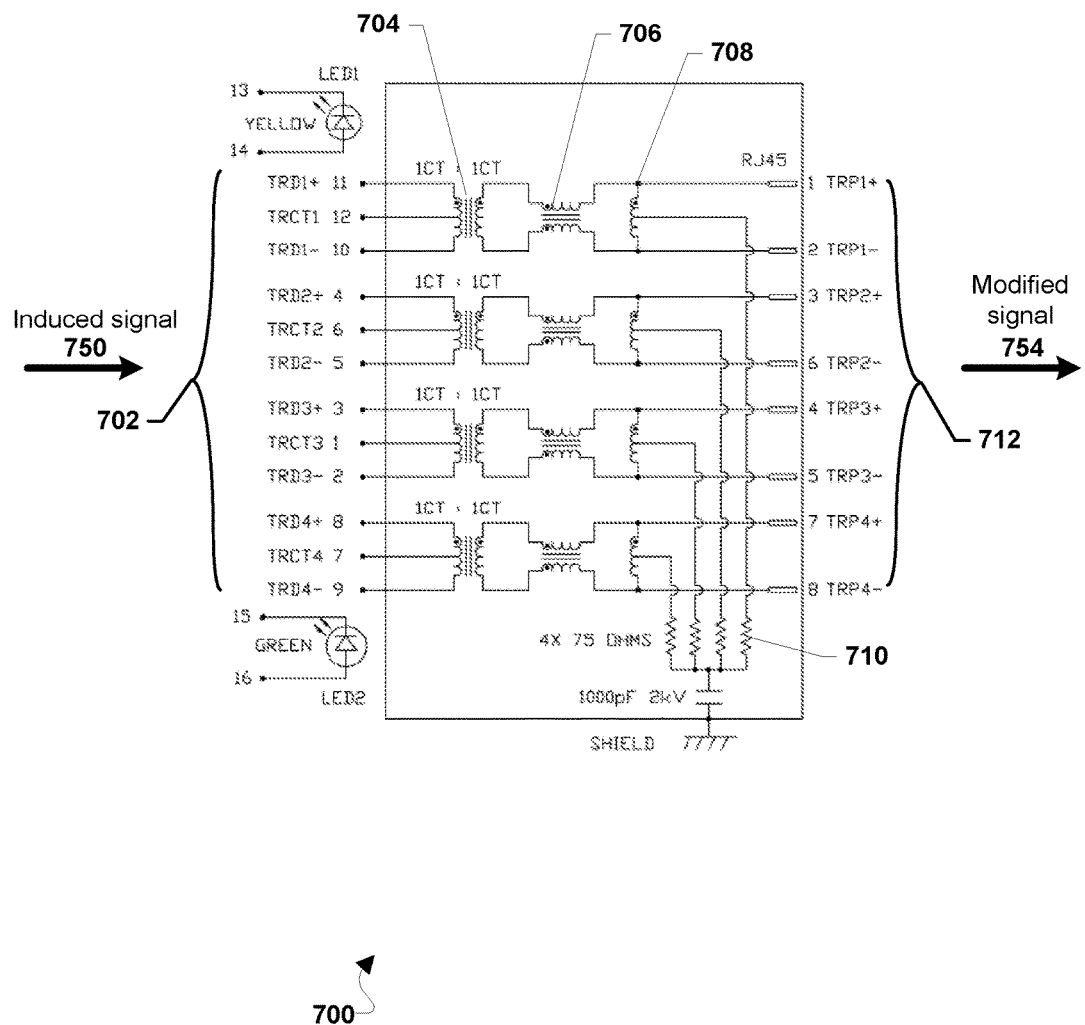
FIG. 7 is a circuit diagram illustrating a signal modifier subunit of an embodiment isolation unit.

FIG. 7 is a circuit diagram illustrating a signal modifier subunit 700 of an embodiment isolation unit. With reference to FIGS. 1-7, the signal modifier subunit 700 may include input pins 702, one or more first transformers 704, one or more second transformers 706, one or more inductors 708, one or more resistors 710, and one or more output pins 712. The signal modifier subunit 700 may receive an induced signal 750 at one or more of the input pins 702, such as triboelectrically or piezoelectrically induced electrical signal from an appliance (e.g., the appliance 104) in a powered-off state.

The induced electrical signal may then be passed to the first transformers 704. The first transformers 704 may include inductor coils to electrically isolate the induced electrical signal. In some embodiments, the first transformers 704 do not include metallic connections such the first transformers 704 do not provide any metallic electrical connection. Thus, the first transformers 704 provide a transformer-only coupling for the electrical signal. In some embodiments, the first transformers 704 may operate to provide a frequency filtration function on one or more frequencies of the induced signal. In some embodiments, the first transformers 704 may attenuate one or more frequencies of the electrical signal in a range of approximately 200

Hz-10,000 Hz. In some embodiments, the first transformers 704 may attenuate one or more frequencies of the electrical signal in a human voice speech range (e.g., approximately 300 Hz-5,000 Hz).

The electrical signal may then pass to second transformers 706. In some embodiments, the second transformers 706 may provide a common mode choke function. In some embodiments, the second transformers 706 may operate to electromagnetically cancel one or more aspects of an amplitude of the electrical signal.

The electrical signal may then pass to the inductors 708, and then to the resistors 710. The inductors 708 and/or the resistors 710, alone or in combination, may operate to provide impedance matching to the electrical signal. The inductors 708 and the resistors 710, alone or in combination, may also operate to limit an amplitude of a current of the electrical signal. In some embodiments, the inductors 708 and/or the resistors 710 may modify the electrical signal to reduce an amplitude of the electrical signal to be substantially below −120 dB. In some embodiments, the inductors 708 and/or the resistors 710 may modify the electrical signal to reduce an amplitude of the electrical signal such that an amplitude component of the electrical signal (e.g., a portion of the overall amplitude of the electrical signal) may be above −120 dB, and no intelligible audio signal (or intelligible voice signal) may be recovered from the electrical signal.

The signal modifier subunit 700 may then provide a modified signal 754 via the output pins 712. In some embodiments, the output pins 712 may be a component of a connector, such as an RJ-45 cable connector, to enable a connection of the isolation unit to a physical connector, such as the physical connector 110.

The modified signal may propagate through a downstream cable (e.g., the physical connector 110). In various embodiments, the modified signal cannot be transformed to extract an intelligible audio signal. In some embodiments, the unintelligible audio signal may be an unintelligible speech signal.

Figure 8:
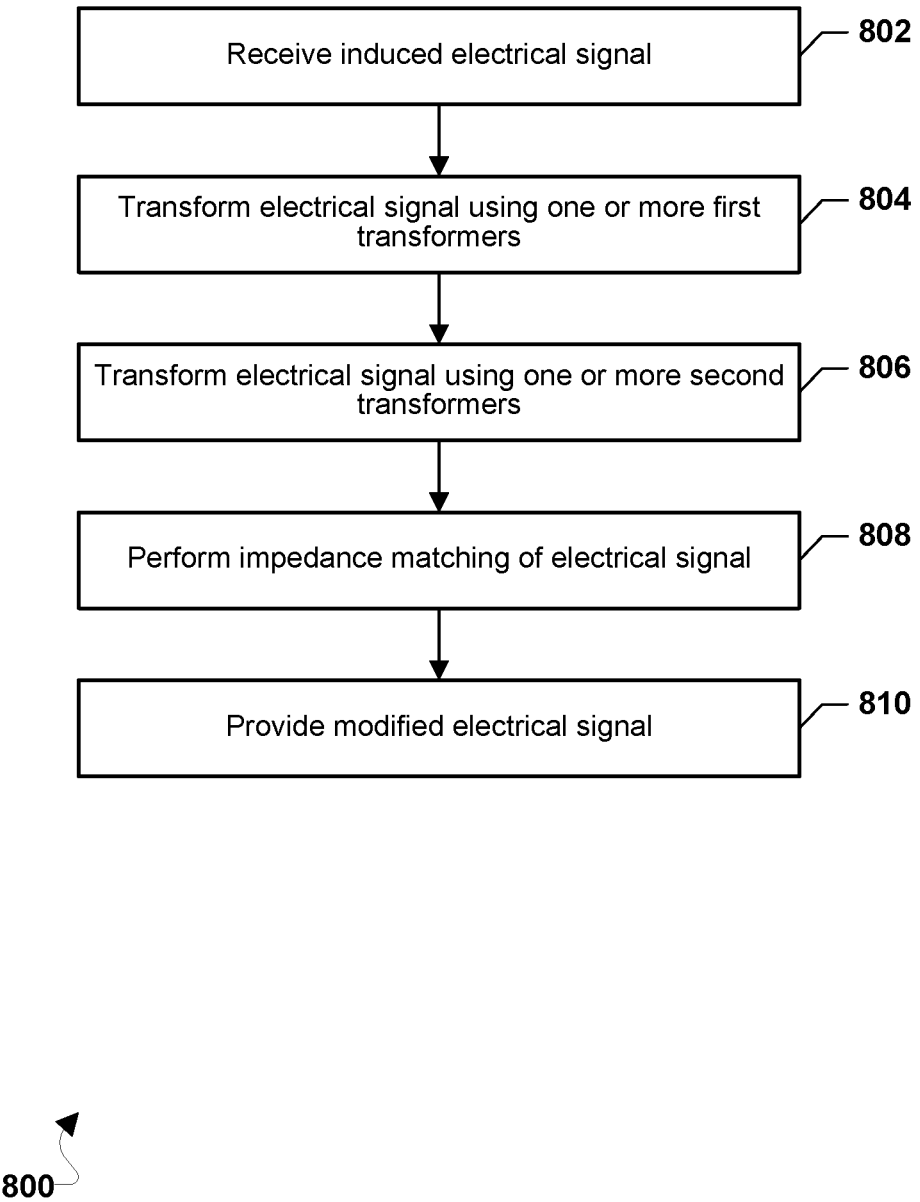
FIG. 8 is a process flow diagram illustrating a method for mitigating an induced electrical signal from an appliance in a powered-off state according to various embodiments.
Figure 9A:
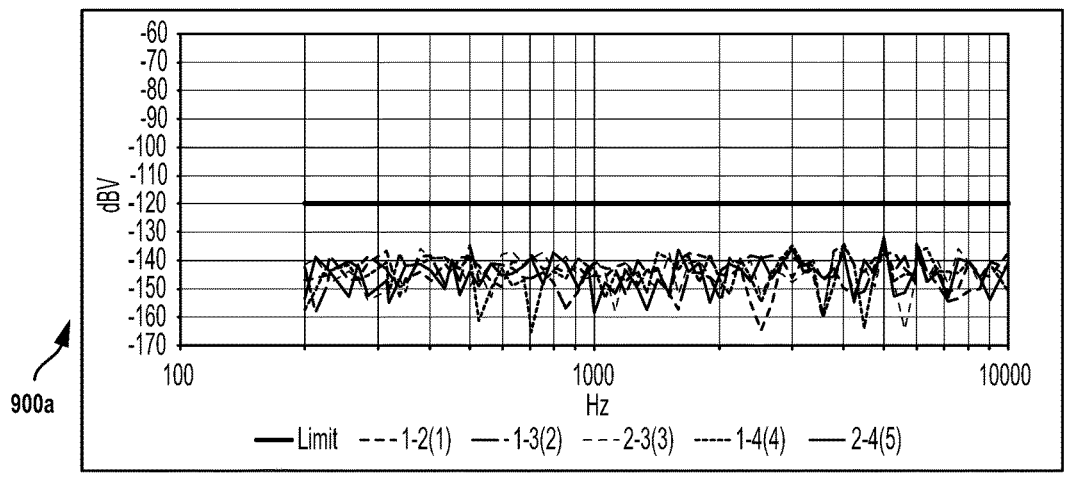
FIGS. 9A-H are plots illustrating test results of an embodiment isolation unit.
Figure 9B:
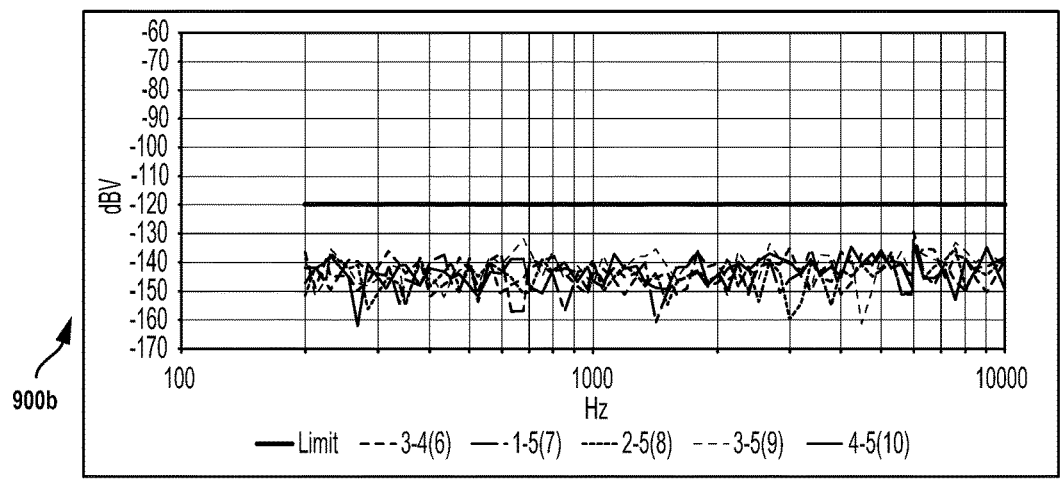
Figure 9C:
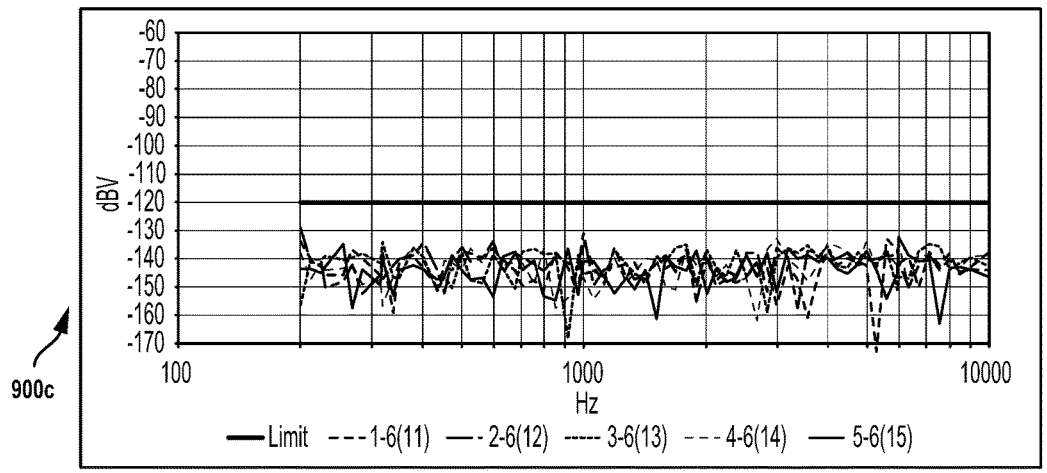
Figure 9D:
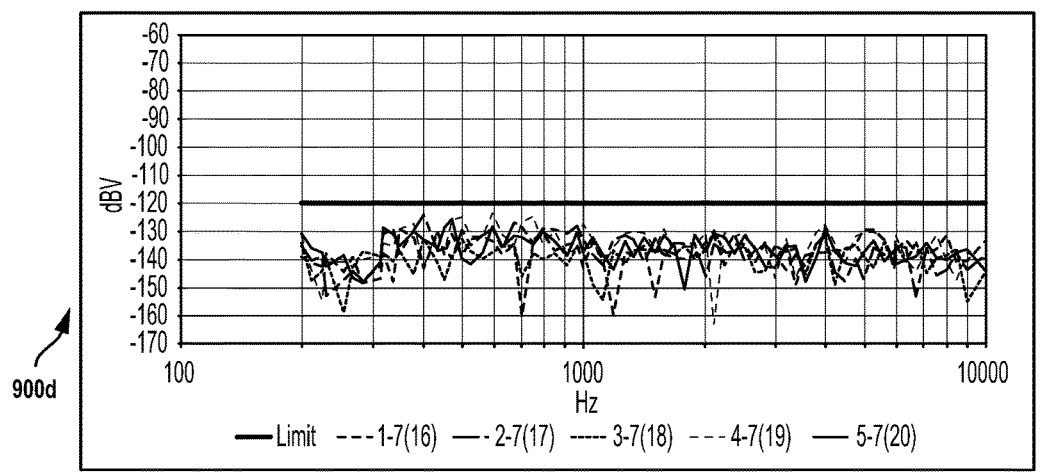
Figure 9E:
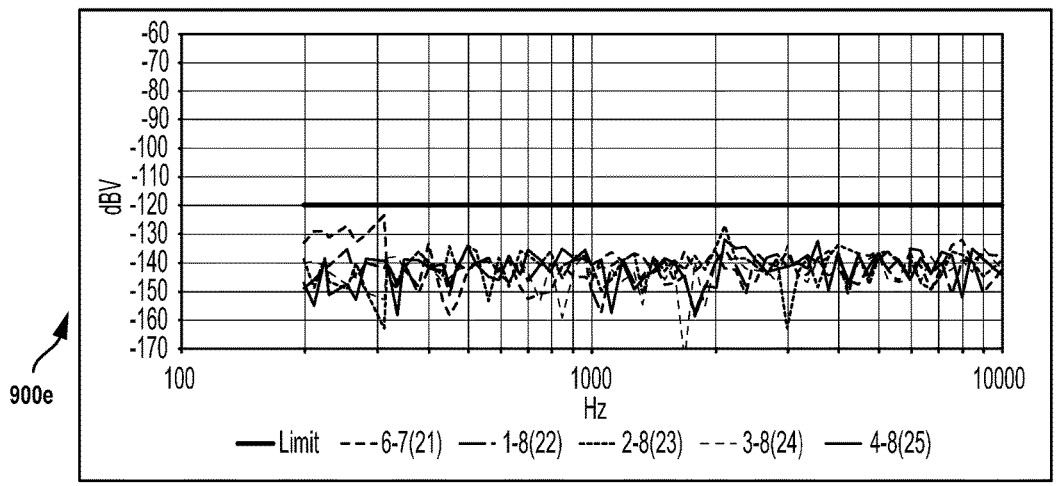
Figure 9F:
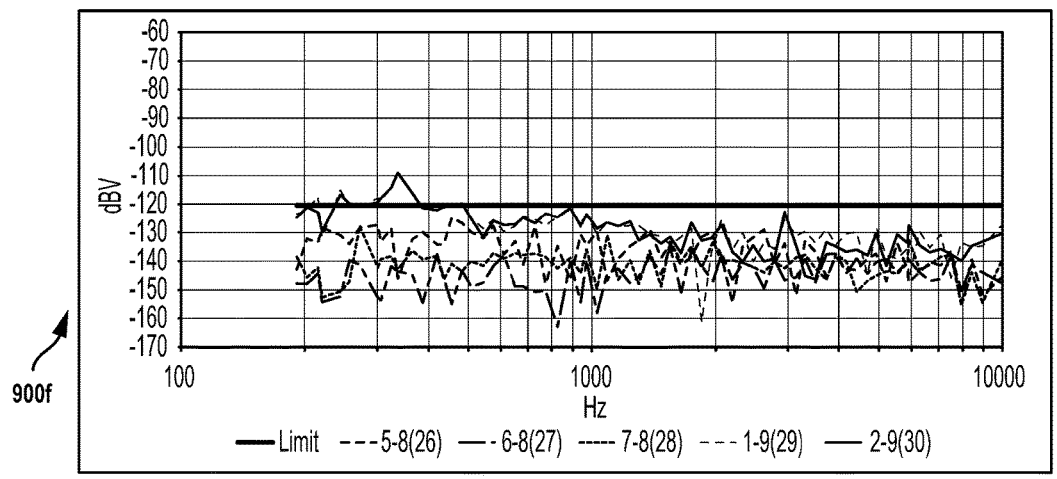
Figure 9G:
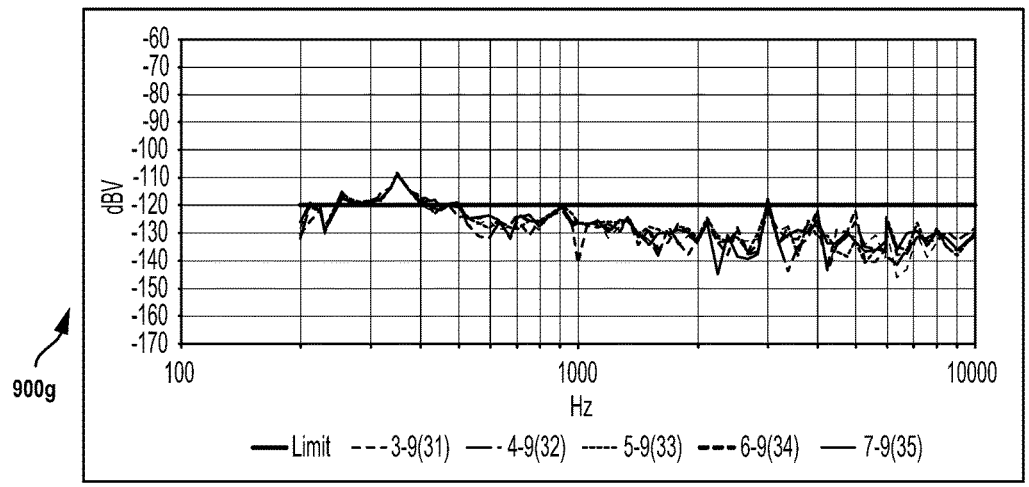
Figure 9H:
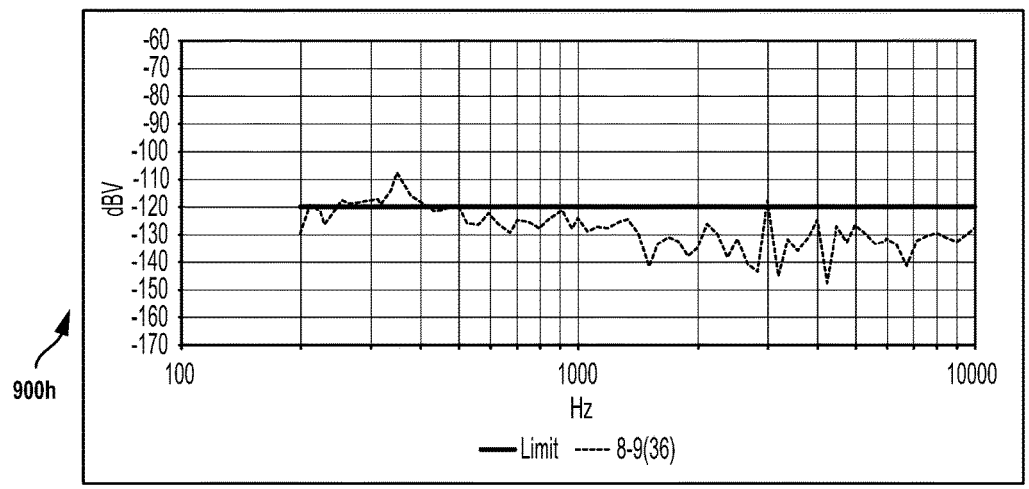

FIG. 8 is a process flow diagram illustrating a method 800 for mitigating an induced electrical signal from an appliance in a powered-off state. With reference to FIGS. 1-8, the method 800 may be implemented by an isolation unit (e.g., the isolation unit 102, 400).

In block 802, the isolation unit may receive an induced electrical signal. For example, the isolation unit may receive may an induced electrical signal, such as a triboelectrically or piezoelectrically induced electrical signal from an appliance (e.g., the appliance 104) in a powered-off state.

In block 804, the isolation unit may transform the electrical signal using one or more first transformers. For example, the isolation unit may pass the induced electrical signal to the first transformers 704. The first transformers 704 may include inductor coils to electrically isolate the induced electrical signal. In some embodiments, the first transformers 704 do not include metallic connections such the first transformers 704 do not provide any metallic electrical connection. Thus, the first transformer 704 provide a transformer-only coupling for the electrical signal. In some embodiments, the first transformer 704 may operate to provide a frequency filtration function on one or more frequencies of the induced signal.

In block 806, the isolation unit may transform the electrical signal using one or more second transformer. For example, the isolation unit may pass the electrical signal from the first transformers 704 the second transformers 706. In some embodiments, the second transformers 706 may provide a common mode choke function. In some embodiments, the second transformers 706 may operate to electromagnetically cancel one or more aspects of an amplitude of the electrical signal.

In block 808, the isolation unit may perform impedance matching the electrical signal. For example, the isolation unit may pass the electrical signal from the second transformers 706 to the inductors 708 and the resistors 710. In some embodiments, the inductors 708 and the resistors 710 may operate to provide impedance matching to the electrical signal. In some embodiments, the inductors 708 and the resistors 710 may operate to perform amplitude attenuation of the electrical signal. In some embodiments, the inductors 708 and the resistors 710 may operate to limit an amplitude of a current of the electrical signal. In some embodiments, the inductors 708 and the resistors 710 may operate to perform any combination of the foregoing.

In block 810, the isolation unit may provide a modified electrical signal. For example, the isolation unit may provide the modified signal 754 via the output pins 712. In some embodiments, the output pins 712 may be a component of a connector, such as an RJ-45 cable connector, to enable a connection of the isolation unit to a physical connector, such as the physical connector 110.

The modified signal may propagate along a cable coupled to the isolation unit (e.g., the physical connector 110). In various embodiments, the modified signal (e.g., the modified signal that propagates along the cable) cannot be transformed to extract an intelligible audio signal. In some embodiments, the unintelligible audio signal may be an unintelligible speech signal.

FIGS. 9A-9H are plots of detected signal amplitude against a test signal frequency illustrating test results 900$a$-900$h$ of an embodiment isolation unit. The detected signal amplitudes illustrated in FIGS. 9A-9H illustrate the performance of an isolation unit operating on an induced electrical signal to produce a modified signal such that the isolation unit satisfies the Committee on National Security Systems (CNSS) Instruction No. 5001.

With reference to FIGS. 1-9H, the isolation unit (e.g., the isolation unit 102, 400) was tested by exposing the isolation unit to a test signal that included one or more tones. Measurements were made of a modified signal that was provided by the isolation unit. In the tests represented by the test results 900$a$-900$h$, two output pins (e.g., the output pins 712) were selected and an attempt was made to detect a modified signal. The test results 900$a$-900$h$ demonstrate that the embodiment isolation unit under test produced one or more modified signals having a signal level below a threshold signal level (indicated in FIGS. 9A-9H as "limit"). The threshold signal level illustrated in FIGS. 9A-9H is −120 dB.

The test results 900$a$-900$e$ illustrate that all of the detected modified signals are below the threshold signal level. Accordingly, the detected modified signals in test results 900$a$-900$e$ cannot be transformed to extract an intelligible audio signal.

The test results 900$f$-900$h$ illustrate that most of the detected modified signals are below the threshold signal level, and that certain modified signal levels were detected above the threshold signal level. However, in the test results 900$f$-900$h$, the modified signal levels detected above the threshold signal level are below 400 Hz, and the detected modified signals illustrated in the test results 900$f$-900$h$ also cannot be transformed to extract and intelligible audio signal.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the embodiments. Thus, various embodiments are not intended to be limited to the embodiments shown herein but are to be accorded the widest scope consistent with the following claims and the principles and novel features disclosed herein.

What is claimed is:

1. An isolation unit, comprising:
   a signal modifier, configured to:
   receive, at a plurality of first transformers, an induced electrical signal from an appliance, wherein the induced electrical signal is induced by ambient sound waves incident on the appliance;
   modify, by the plurality of first transformers, the induced electrical signal by filtering one or more frequencies of the induced electrical signal to produce a modified electrical signal that may not be transformed into an intelligible audio signal; and
   output the modified electrical signal.

2. The isolation unit of claim 1, wherein the induced electrical signal is one of:
   triboelectrically induced by the ambient sound waves incident on the appliance; and
   piezoelectrically induced by the ambient sound waves incident on the appliance.

3. The isolation unit of claim 1, wherein the induced electrical signal is induced by the ambient sound waves incident on the appliance when the appliance is in a powered-off state.

4. The isolation unit of claim 1, wherein the plurality of first transformers are configured to electrically isolate the induced electrical signal.

5. The isolation unit of claim 4, wherein the signal modifier further comprises:
   one or more second transformers configured to:
   receive the induced electrical signal from the plurality of first transformers; and
   provide a common mode choke function on the induced electrical signal.

6. The isolation unit of claim 5, wherein the one or more second transformers are configured to cancel one or more aspects of an amplitude of the induced electrical signal.

7. The isolation unit of claim 5, wherein the signal modifier further comprises:
   one or more inductors configured to limit an amplitude of a current of the induced electrical signal.

8. The isolation unit of claim 7, wherein the signal modifier further comprises:
one or more resistors in communication with the one or more inductors,
wherein the one or more inductors and the one or more resistors are configured to limit the amplitude of the current of the induced electrical signal.

9. The isolation unit of claim 1, wherein the plurality of first transformers are configured to attenuate the one or more frequencies of the induced electrical signal in range of from approximately 200 Hz to approximately 10,000 Hz.

10. The isolation unit of claim 1, wherein the plurality of first transformers are configured to attenuate the one or more frequencies of the induced electrical signal in a range of from approximately 300 Hz to approximately 5,000Hz.

11. The isolation unit of claim 1, wherein the signal modifier is further configured such that an amplitude of the modified electrical signal is substantially below −120dB.

12. A method of modifying an induced electrical signal that is induced by ambient sound waves incident on an appliance, comprising:
receiving, at a plurality of first transformers of an isolation unit, the induced electrical signal from the appliance;
modifying, by the plurality of first transformers, the induced electrical signal by filtering one or more frequencies of the induced electrical signal to produce a modified electrical signal that may not be transformed into an intelligible audio signal; and
outputting the modified electrical signal.

13. The method of claim 12, wherein the induced electrical signal is one of:
triboelectrically induced by the ambient sound waves incident on the appliance; and
piezoelectrically induced by the ambient sound waves incident on the appliance.

14. The method of claim 12, wherein the induced electrical signal is induced by the ambient sound waves incident on the appliance when the appliance is in a powered-off state.

15. The method of claim 12, wherein modifying, by the plurality of first transformers, the induced electrical signal by filtering one or more frequencies of the induced electrical signal to produce a modified electrical signal that may not be transformed into an intelligible audio signal comprises:
electrically isolating the induced electrical signal by one or more first transformers.

16. The method of claim 15, wherein modifying, by the plurality of first transformers, the induced electrical signal by filtering one or more frequencies of the induced electrical signal to produce a modified electrical signal that may not be transformed into an intelligible audio signal comprises:
receiving, at one or more second transformers, the induced electrical signal from the plurality of first transformers, and providing a common mode choke function on the induced electrical signal.

17. The method of claim 16, further comprising:
canceling, by the one or more second transformers, one or more aspects of an amplitude of the induced electrical signal.

18. The method of claim 12, wherein filtering the one or more frequencies of the induced electrical signal comprises attenuating one or more frequencies of the induced electrical signal in range of from approximately 200 Hz to approximately 10,000 Hz.

19. The method of claim 12, wherein filtering the one or more frequencies of the induced electrical signal comprises attenuating one or more frequencies of the induced electrical signal in range of from approximately 300 Hz to approximately 5,000 Hz.

20. The method of claim 12, wherein an amplitude of the modified electrical signal is substantially below −120 dB.

21. The method of claim 12, wherein modifying the induced electrical signal to produce a modified electrical signal that may not be transformed into an intelligible audio signal comprises:
limiting, by one or more inductors, an amplitude of a current of the induced electrical signal.

22. The method of claim 21, wherein limiting, by the one or more inductors, the amplitude of the current of the induced electrical signal comprises:
limiting, by the one or more inductors and one or more resistors in communication with the one or more inductors, the amplitude of the current of the induced electrical signal.

* * * * *